Aug. 19, 1969  B. V. BLIZNAK  3,461,555
CABLE-CUTTING PLIERS WITH LEADING TOOTH
Filed Oct. 18, 1967
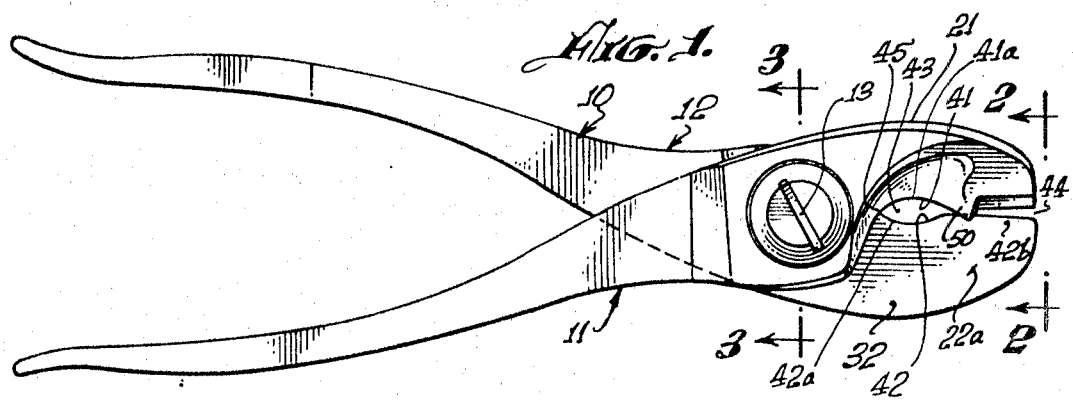
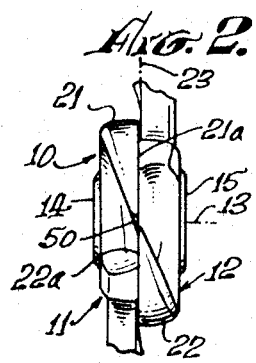
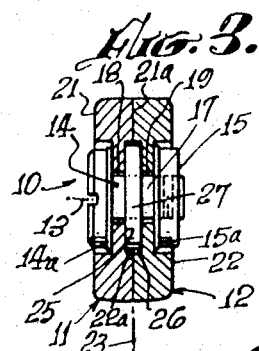
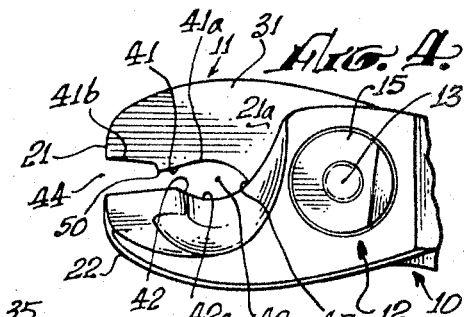
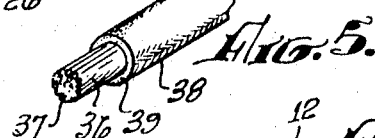
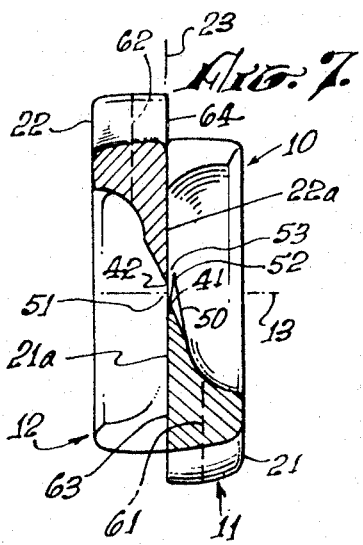
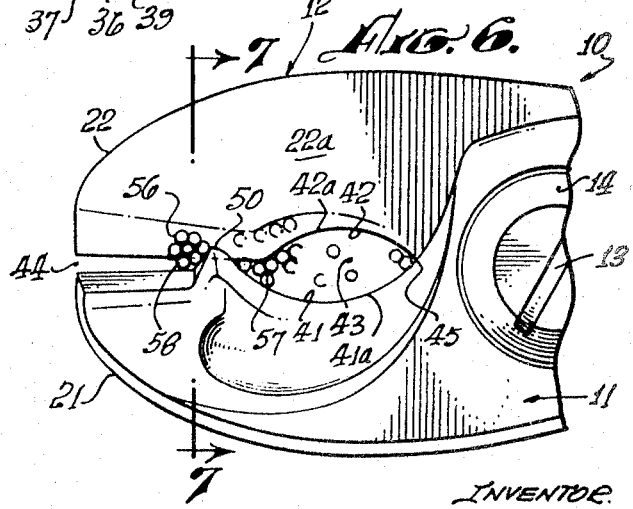
INVENTOR.
BEDRICH V. BLIZNAK,
By Edmond F. Shanahan
ATTORNEY.

United States Patent Office 3,461,555
Patented Aug. 19, 1969

3,461,555
CABLE-CUTTING PLIERS WITH LEADING TOOTH
Bedrich V. Bliznak, 15025 Saticoy St., Apt. 7,
Van Nuys, Calif. 91405
Filed Oct. 18, 1967, Ser. No. 676,150
Int. Cl. B26b 13/16, 13/28
U.S. Cl. 30—254                                            3 Claims

ABSTRACT OF THE DISCLOSURE

A pliers for cutting multi-strand telephone cables, or the like, the opposing blades of said pliers having opposite concave cutting edges at the throat, opposite straight cutting edges at the mouth, and one blade having a leading tooth between the two sets of cutting edges.

---

This invention relates generally to pliers used for cutting multi-strand, jacketed cables, particularly those cables used in telephone and other communications work; more particularly, the invention relates to such a pliers in which the opposed cutting blades provide both concave blade cutting and straight edge blade cutting at very close tolerance, and in which one of the blades is provided with a leading tooth which serves to anchor the cable during cutting, and also to provide a cam action guide for proper blade passage.

Although the cable-cutting pliers of the present invention will be found to have a great versatility in application, being useful not only on the multi-strand copper conductors used for communication, but also on small-size multi-strand steel cables, with or without jackets, used for other purposes. However, the pliers of the invention have unique application and utility for use on multi-strand communication cables by the highly skilled craftsmen who are employed by the telephone companies and other communication companies. Communication craftsmen generally work on multi-strand cables in which many very fine copper wires, each enclosed in its own insulating sheath, are all enclosed in an outer insulating cable sleeve; both cable sleeve and the insulation on individual copper wires is usually of some plastic material, selected from those well known to those in the communications art. Multi-strand cables between one-quarter inch and an inch in diameter, and containing dozens of separately insulated copper wire strands are common in the communication industries.

Terminal connections to the end of a multi-strand communications cable must be cut with precision, generally with all strands terminating at substantially the same plane; also, it is generally necessary that the cable sleeve be precisely trimmed at a predetermined distance along the length of the cable, spaced back of the terminal ends of the copper wire strands.

The communication craftsmen must perform their work in the field, most of the time, and it is important that they be able to accomplish their many cable cutting and trimming tasks with a single cable-cutting pliers for all sizes of multi-strand cables they commonly encounter, and for all types of cable termination trimming which they ordinarily would encounter in their work.

Unfortunately, cable-cutting pliers heretofore employed by communication craftsmen, have prove unsatisfactory or deficient in some cable cutting or trimming functions, although performing adequately for other functions. Some pliers are excellent for cutting relatively small-sized cables which are encountered by the craftsmen in the great majority of his tasks, but the same pliers has proven incapable of dealing with a relatively large cable, which the craftsmen might encounter only a few times in a month. Craftsmen have sometimes found themselves compelled to carry an extra cutter for dealing with large cables.

Generally, cable-cutting pliers suitable for cutting large multi-strand communication cables are not satisfactory for performing the insulation trimming tasks on the end of a cable. The latter tasks call for relatively straight-edged blade edges, which are best for the sheath-trimming and for skinning insulation from individual wires; such straight-edged blades are often called nipping blades. Conflicting with the nipping requirements, the cutting of a multi-strand cable is best accomplished by blades which are curved in some combination of convex or concave blade edges.

The manual cutting of the larger multi-strand cables subjects the pliers to severe tests. The lever arms of the pliers must be of a tough steel characterized by good hand-tool qualities rather than the hardness and suitability for grinding which should characterize the cutting blades themselves. A solution for this problem is found by welding cutting blades of great hardness to plier lever arms of softer material. Unfortunately, abuse of pliers so constructed in use, may result in such severe injury to the blade edges that the pliers must be scrapped. Such damage may arise if, from hard usage, the two plier lever arms are slightly deformed during a severe cable-cutting operation, permitting the cutting blades to butt at some points or to slightly cross over, so as to engage each other edge to edge.

The danger of blade injury by undesired cross over at the blade edges is increased if the pivot connection between the two plier lever arms is of a resilient construction. It is desirable to have a resilient compressible spacer between the plier lever arms at their pivotal connection to permit close adjustment of the very minute spacing between the adjacent plane surfaces of the two plier blades. The very presence of this deformable spacer increases the possibility of bad blade engagement when a pliers with slightly dulled blades is subjected to heavy pressure in the cutting of a large cable.

The danger of damage to the cutting edges of the blades during the cutting of a heavy cable has been found to be much increased if part of the blade edges are straight, as required for the insulation-nipping operations. Consequently, communication craftsmen often carry two separate pliers, one for cable cutting and one for nipping insulation.

Still another problem encountered with cable-cutting pliers has been the tendency, when cutting a large multi-strand cable, for the cable to be pushed outwardly from the throat of the pliers as the cutting operation progresses, with the result that one edge of the cable may be only partially cut, and a second cutting operation may be required, with resultant waste of time, or a ragged cut at the cable end.

It is the major object of the present invention to overcome all of the foregoing problems by means of a single all-purpose cable-cutting and nipping pliers.

Moreover, it is the purpose of the present invention to provide a new plier design which is proof against undesirable blade cross-over, even under conditions of abuse, and regardless of whether or not the resilient type of spacer is used in the pivotal connection between the lever arms. It will be appreciated that the design of the invention finds unique and outstanding utility if the resilient pivotal connection, which is very desirable, is employed in the pliers; when a resilient spacer is incorporated in the pliers of the invention, a preferred species of the invention is produced, in a form which would not be practical to construct were it not for the novel design disclosed by the present invention.

The foregoing and other objects and advantages of the invention will be understood from the following description of one preferred specific embodiment, when the description is read in connection with the accompanying drawings, in which:

FIGURE 1 is a front elevational view of a pliers constructed according to the invention;

FIGURE 2 is an end view of the pliers FIGURE 1, as viewed in the direction of the arrows 2—2, seen in FIGURE 1;

FIGURE 3 is a vertical sectional view transverse to the longitudinal axis of the pliers FIGURE 1, taken at the vertical plane indicated in FIGURE 1 by the arrows 3—3;

FIGURE 4 is an elevational view of the jaws and pivotal connection of the pliers FIGURE 1, seen from the back side of FIGURE 1, with the pliers reversed in direction, and the lever arm handles deleted;

FIGURE 5 is a perspective view of the terminal end of a cable, which has been cut, and the insulation of which has been trimmed, by means of the pliers of the invention;

FIGURE 6 is an enlarged front elevational view of the cutting blades of the pliers of FIGURES 1 to 4, viewed from the same side of the pliers as FIGURE 1, but with the pliers inverted and reversed in disposition; and FIGURE 7 is a sectional view through the cutting jaws of the pliers in FIGURE 6, taken at the vertical plane, and seen in the direction of the arrows, indicated by the numerals 7—7 in FIGURE 6.

In FIGURE 1, the cable-cutting pliers of the invention is indicated generally by the numeral 10. Like any pliers, pliers 10 is constructed fundamentally of a pair of pivoted levers 11 and 12, which are typically connected at a pivot axis 13 by means of a pivot bolt 14 and nut 15 (seen in the sectional view of FIGURE 3), the shank 17 of the bolt 14 being received through transverse bores 18 and 19 in the levers 11 and 12, respectively.

As viewed in FIGURE 1, the portions of the levers 11 and 12 to the left of the pivot axis 13 may be referred to as their handle sections, and the portions viewed at the right of pivot axis 13 may be referred to as the jaw sections.

The jaw section end view of FIGURE 2 (and also the vertical transverse sectional view of FIGURE 7) reveal that the jaws 21 and 22 have vertical, mating plane surfaces 21a and 22a, which are generally in contact with each other, when jaws 21 and 22 close sufficiently to overlap, at a vertical mating plane 23. Mating plane 23 continues into the region of the pivotal connection 13, as indicated in FIGURE 3. It will be seen from the foregoing that the pliers of the invention is of the type in which pivoting and cutting occurs at the mating plane 23, and that the lever arms 11 and 12 assemble to one another with their entire jaw section ends lying substantially in the mating plane 23 and fitting flat together, or very nearly so.

FIGURE 3 shows the preferred form of construction for the pivotal connection 13. The head of bolt 14 and the nut 15 are recessed into the outer surfaces of levers 11 and 12 respectively, in recesses 14a and 15a concentric with the axis of pivotal connection 13. Mating inner recesses 25 and 26, coaxial with shank 17, are provided to accommodate a spacer bushing 27. It is a preferred form of construction that spacer bushing 27 be made of a tough and resilient but compressible plastic material, having surfaces which provide frictional slippage with adjacent metal walls of lever arms 11 and 12. Teflon and nylon are examples of such plastic. The resilient spacer 27 makes it possible to have both good rotational characteristics for the operation of pliers 10, and also for the user to tighten or loosen bolt 14 and nut 15 to slightly change the pressure or spacing between the plane blade surfaces 31 and 32 of jaws 21 and 22 respectively (blade surface 31 being seen in FIGURE 4).

The perspective view of FIGURE 5 is a fragmentary illustration of a typical multi-strand cable 35, shown with a large number of separately insulated copper strands 36 neatly trimmed at end 37 to the same length, and with the outer cable sheath 38 trimmed to a perfect circle at 39, spaced back along cable 35 from the strand ends 37.

The front and back profile views of blade edges 41 and 42, seen at FIGURES 1 and 4 respectively, reveal that the blade edges 41 and 42 have facing concave sections 41a and 42a in the throat portion 43 of the opening between jaws 21 and 22, and substantially straight outer edges 41b and 42b at the mouth of jaws 21 and 22. The mouth opening, at the extreme left of FIGURE 4, may be indicated by the numeral 44. It will be understood that the throat point 45, at which concave blade edges 41a and 42a cross each other, is a point which continuously moves to the left of FIGURE 4 as jaws 21 and 22 are moving in a closing direction.

The combination of opposite concave cutting edges 41a and 42a in the throat 43 with substantially straight nipping edges 41b and 42b near the mouth 44 would ordinarily be considered as likely to produce disastrous blade damage as a result of slight blade cross-over, during hard usage, were it not for the combination with the blade edges 41 and 42 were it not for the provision of a blade tooth 50, which is specially designed to provide a camming action against plane blade surface 22a on the opposite jaw 22. As will be seen hereinafter, the tooth 50, and the associated structure of the pliers 10 not only provides this camming action, but simultaneously provides an anchoring function of great advantage in cutting large cables.

The operation and advantages of tooth 50 are illustrated in enlarged detail in FIGURES 6 and 7. The closure sequence of jaws 21 and 22 can be seen by following them from a partially opened position in FIGURE 4, to the beginning of closure in FIGURE 1, and in FIGURES 6 and 7, with tooth 50 substantially overlapping blade surface 22a, and closure of straight blade surfaces 41b and 42b about to take place.

It is important to note in the sectional view of FIGURE 7 that the camming wall 51 on the inner face 21a of jaw 21 is relieved slightly toward the point 52 of tooth 50, so as to provide a tolerance space 53 insuring against unwanted blade crossover, regardless of deformation, blade dullness, or severe pressure in the cutting of a massive multi-strand cable.

The elevational view of FIGURE 6 has a few strands 56 of a large multi-strand cable as it is being cut by the blade edges 41 and 42. Typically, the large cable 44 may experience the first cutting pressure at the throat point 45, at which the sheath 38 and the nearest strands 36 are first engaged by the cutting edges 41 and 42. But in the pliers 10, the tooth 50 engages and anchors the edge of cable 56, if it is a large cable relative to pliers 10, very soon after cutting begins at 45, or depending on the technique of the craftsman, even before cutting begins at 45. As a result of this anchoring, cutting is forcibly imposed on the large cable 56 not only at the throat point 45 but at a cross-over point 57, which actually moves during cutting back toward the pivot axis 13. A small part of the cable 56 may actually be cut by the straight edges 41b and 42b as indicated at 58. Ordinarily, such straight edges would tend to expel the cable 56 from the pliers 10, but in the present invention, the anchoring effect of tooth 50 prevents any such expulsion. A preferred construction from two different kinds of steel for the blade edges 41 and 42, and the lever arms 11 and 12 as indicated in FIGURE 7 by the vertical dashed lines 61 and 62 which indicate planes of welding between blade members 63 and lever arm 11, at blade 64 and lever arm 12.

A preferred construction for the blade edges 41 and 42, which has unique co-acting advantages with the construction of this invention is that, as illustrated in the profile views of FIGURE 1, FIGURE 4, and FIGURE 6, the blade edge 41a which bears tooth 50 has a much larger radius than blade edge 42a. This arrangement not only achieves a rolling and shearing cutting action, but in the present invention, it places the camming wall 51 of tooth 50 against a portion of the straight edge 42b of the blade edge 42 which has no tooth. This insures more reliable camming engagement and camming action.

It is a noteworthy feature of the construction illustrated that the tooth 50 is substantially the dividing point between concave cutting edges 41a and 42a, and straight cutting edges 41b and 42b.

The foregoing description is illustrative only of the principles of the invention. Numerous modifications and changes will readily occur to those skilled in the art, and it is not desired to limit the invention to the exact construction and operation shown in the drawings and described in detail herein. All suitable modifications and equivalents which fall within the scope of the following claims are included within the scope of the invention.

I claim:
1. A cable-cutting pliers which includes:
   a pair of pivoted levers, each having a jaw section and a handle section extending longitudinally from opposite sides of a pivotal connection, and each of said levers having a substantially plane surface between said jaw sections and the region of said pivotal connection, at a mating plane longitudinal with respect to said pliers;
   a pair of mating cutting blades defined by the adjacent walls of said jaw sections, said blades having opposite cutting edges substantially at said mating plane, said edges extending from a throat section adjacent said pivotal connection of said jaws, to a mouth section at the opening of said jaws, said edges defining opposite concave cutting edges at said mating plane in said throat section and substantially straight cutting edges at said mating plane in said mouth section;
   a blade tooth integral with one of said blade edges at a location defining a dividing point on the edge of said blade between its concave and straight-line edge portions, said tooth projecting toward the blade edge of the opposite jaw of said pliers, and, upon closure movement of said jaws, said tooth having a point making first passage of the mouth section of said opposite jaw adjacent said mating plane, but with the wall of said tooth adjacent said mating plane diverging from said mating plane toward said tooth point to insure a clearance at initial jaw closure and to provide a camming action between said blades to prevent crossover cutting edge engagement during closure.

2. A combination as described in claim 1 in which said pivotal connection is comprised of a pivot bolt and nut through said jaws at said axis of said pivotal connection, and a resiliently compressible spacer is provided between the adjacent walls of said jaws at said point of pivotal connection to permit relative adjustment between said lever arms of said pliers by adjustment of said pivot bolt and nut to adjust the degree of resilient deformation of said spacer.

3. A combination as described in claim 1 in which the concave cutting edge in the throat section of the blade carrying said tooth is substantially greater in curvature than the concave section of the opposite blade.

References Cited
UNITED STATES PATENTS

| 1,520,529 | 12/1924 | Cagle | 30—254 |
| 2,169,580 | 8/1939 | Conway | 30—267 |
| 2,794,250 | 6/1957 | Bethune | 30—254 |
| 3,196,540 | 7/1965 | Porzky | 30—254 |

ROBERT C. RIORDON, Primary Examiner

J. C. PETERS, Assistant Examiner

U.S. Cl. X.R.

30—266